United States Patent
Katayama

(10) Patent No.: US 7,339,154 B2
(45) Date of Patent: Mar. 4, 2008

(54) LEVEL DETECTOR

(75) Inventor: Yasutaka Katayama, Tokyo (JP)

(73) Assignee: Kabushiki Kaisha TOPCON, Tokyo (JP)

( * ) Notice: Subject to any disclaimer, the term of this patent is extended or adjusted under 35 U.S.C. 154(b) by 0 days.

(21) Appl. No.: 11/583,655

(22) Filed: Oct. 18, 2006

(65) Prior Publication Data

US 2007/0084988 A1    Apr. 19, 2007

(30) Foreign Application Priority Data

Oct. 19, 2005    (JP) .............................. 2005-304307

(51) Int. Cl.
  *G01J 1/44* (2006.01)
  *H01J 40/14* (2006.01)
  *H03F 3/08* (2006.01)
  *H03G 3/20* (2006.01)

(52) U.S. Cl. ............................. 250/214 R; 250/214 A; 250/214 AG

(58) Field of Classification Search ............. 250/214 R, 250/214.1, 214 A, 214 LA, 214 LS, 214 AG; 327/314, 315; 330/308

See application file for complete search history.

(56) References Cited

U.S. PATENT DOCUMENTS

| | | | |
|---|---|---|---|
| 5,177,560 A * | 1/1993 | Stimple et al. ............. | 356/308 |
| 5,347,120 A * | 9/1994 | Decker et al. .......... | 250/214 B |
| 5,381,131 A * | 1/1995 | Mochizuki et al. ......... | 340/630 |
| 5,457,310 A * | 10/1995 | Fournier .................. | 250/206.2 |
| 5,923,427 A * | 7/1999 | Dong ......................... | 356/623 |
| 5,952,883 A * | 9/1999 | Masuta ....................... | 330/279 |
| 6,462,326 B1 * | 10/2002 | Cleaver .................. | 250/214 R |
| 6,927,628 B2 * | 8/2005 | Oshima et al. ............. | 330/133 |
| 7,265,626 B2 * | 9/2007 | Teo et al. .................... | 330/279 |

FOREIGN PATENT DOCUMENTS

JP    2004-309440    11/2004

* cited by examiner

Primary Examiner—Georgia Epps
Assistant Examiner—Suezu Ellis
(74) Attorney, Agent, or Firm—Chapman and Cutler LLP

(57) ABSTRACT

A level detector includes a light receiving element unit having a plurality of light receiving elements; a first amplifier circuit configured to amplify a light receiving signal; a first gain switching circuit; a first peak hold circuit; an arithmetic control device configured to analyze a light receiving position of the position detection unit; a second amplifier circuit; and a second gain switching circuit configured to switch and set a gain of the second amplifier circuit, the arithmetic control device analyzes the light receiving position of laser light received by the position detection unit, based on a signal output from the second amplifier circuit.

6 Claims, 2 Drawing Sheets

LEVEL DETECTOR

BACKGROUND OF THE INVENTION

1. Field of the Invention

The present invention relates to a level detector which is configured to analyze a light receiving position of laser light received by a light receiving unit. Priority is claimed to Japan Pat. App. No. 2005-304307, filed Oct. 19, 2005, hereby incorporated by reference.

2. Description of the Related Art

In general, a distance measurement device or a level detector which is configured such that: for measuring a distance from a position to another position, or a level to another position, etc., for example, laser light for the measurement is emitted from the position toward another position, and the laser light is received by a light receiving unit provided at the another position, is well-known. Conventionally, JP-A-2004-309440 discloses a level detector configured such that a plurality of light receiving elements are arranged in parallel up and down to form a light receiving element unit, a light receiving position of laser light received by the light receiving element unit is obtained based on a light receiving signal of the light receiving element.

The level detector according to JP-A-2004-309440 includes: a plurality of amplifiers configured to amplify the light receiving signals output from each light receiving element respectively; a plurality of comparators configured to compare signals output from each amplifier with thresholds respectively; and a microprocessor configured to detect a center position of the laser beam received by the light receiving element unit, based on compared signals output from each comparator.

In such a level detector, it is necessary to provide amplifier and comparator for each light receiving element, therefore there are problems that the circuit is complex and the detector is of expensiveness.

Therefore, a level detector is proposed comprising: a first amplifier circuit configured to amplify a light receiving signal output from one terminal of a light receiving element unit; a first peak hold circuit configured to hold a peak value of the light receiving signal output from the first amplifier circuit; a second amplifier circuit configured to amplify a light receiving signal output from another terminal of the light receiving element unit; a second peak hold circuit configured to hold a peak value of the light receiving signal output from the second amplifier circuit; and an arithmetic control device configured to detect a light receiving position of laser light received by the light receiving element unit from the peak values held in the first and the second peak hold circuits.

SUMMARY OF THE INVENTION

However, the proposed level detector receives the laser light emitted from a rotation laser device, and the level detector is used in such a range that a distance between the level detector and the rotation laser device is within a relative wide range, i.e. 3-500 m. In a case that a measurement is performed with a large distance between the level detector and the rotation laser device, an amount of light received by the light receiving element is low due to influence of air or divergence of laser beam, and the light receiving signals output from the light receiving element are extremely small. Therefore, it is necessary to set gains of the first and the second amplifier circuits to be great. In a state that the gains of the first and the second amplifier circuits are set to be great, when the measurement is performed with a small distance between the level detector and the rotation laser device, the light receiving signals output from the light receiving element are too big and saturation generates in the first and the second amplifier circuits.

Therefore, it is necessary to switch the gain according to largeness of light receiving signals output from the light receiving element, for example, in a case that the power supply voltage is large, such as 15V, for example when the distance between the level detector and the rotation laser device is 250 m or less, the gain is 100 times, and when the distance between the level detector and the rotation laser device is more than 250 m, a large gain such as 1000 times can be obtained, and then switching of the gain can be achieved by two stages. While in a case that the power supply voltage is low, such as 3V for extending the life of the battery, the range of the gain is small, for example, when the distance is 50 m, due to the light receiving signals output from the light receiving element being large, the saturation generates when the gain is 100 times, and therefore it is necessary to set the gain for example to be 50 times, accordingly. In addition, in a case that the distance between the level detector and the rotation laser device is 10 m, due to the light receiving signals output from the light receiving element further becoming larger, the saturation generates when the gain is 50 times, so that it is necessary to set the gain for example to be 10 times, accordingly.

Like this, when the power supply voltage is low, such as 3V, it is necessary to switch the gain for some stages finely, according to the distance between the level detector and the rotation laser device, i.e. the amount of light received by the light receiving element. Therefore, there is a problem that the structure of each gain switching circuit (gain switching device) which switches the gain of the first and the second amplifier circuits (amplifier devices) respectively is complex.

The purpose of the present invention is to provide a level detector having a gain switching device configured to switch a gain of an amplifier device with a simple structure, even if a power supply voltage is lowered.

A level detector according to an embodiment of the present invention, comprises: a position detection device including a plurality of light receiving elements which are arranged in parallel with each other; a first amplifier device configured to amplify a light receiving signal output from a terminal of the position detection device; a first gain switching device configured to switch and set a gain of the first amplifier device; a first peak hold device configured to hold a peak value of an amplified signal output from the first amplifier device; an arithmetic control device configured to analyze a light receiving position of laser light received by the position detection device; a second amplifier device configured to amplify the peak value of the amplified signal held by the first peak hold device; and a second gain switching device configured to switch and set a gain of the second amplifier device.

The arithmetic control device analyzes the light receiving position of laser light received by the position detection device, based on a signal output from the second amplifier device.

According to the present invention, the structure of the gain switching device which is configured to switch the gain of the amplifier device can be made simply, even if the power supply voltage is lowered.

The present application claims the benefit of priority to Japan Patent Application No. 2005-304307, filed on Oct. 19, 2005, the disclosure of which is incorporated herein by reference in its entirety.

BRIEF DESCRIPTION OF THE DRAWINGS

For a better understanding of the present invention, reference is made to the attached drawings, where.

DETAILED DESCRIPTION OF THE PREFERRED EMBODIMENTS

An embodiment of a level detector according to the present invention will be described further below, with reference to an exemplary embodiment and the accompanying schematic drawings.

Embodiment

Figure 1:
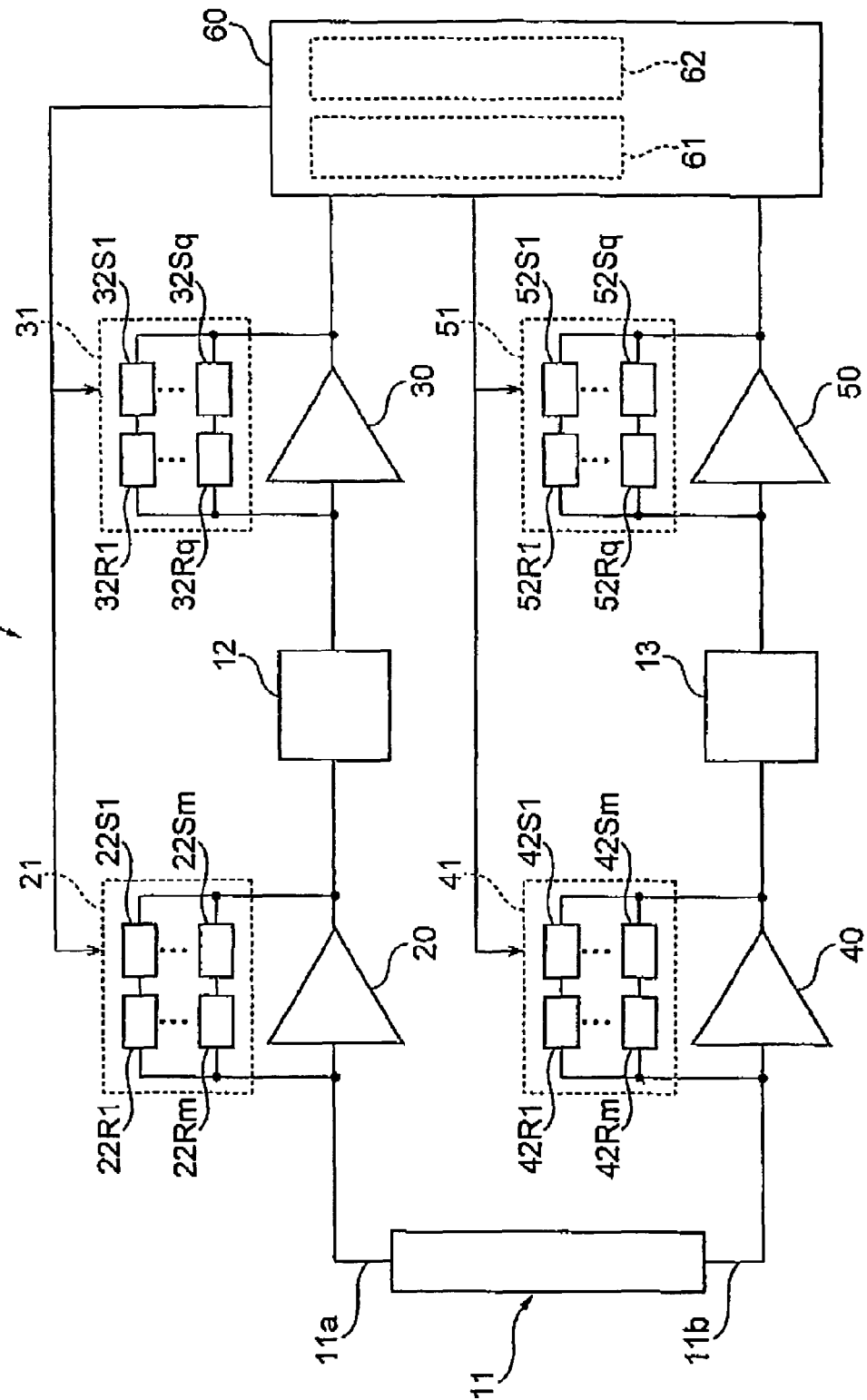
FIG. 1 is a block diagram illustrating a structure of a level detector according to the present invention.

FIG. 1 illustrates a structure of a level detector 10. The level detector 10 comprises: a light receiving element unit (a position detection device) 11; a first amplifier circuit (a first amplifier device) 20 configured to amplify a light receiving signal output from one terminal 11a of the light receiving element unit 11; a first gain switching circuit (a first gain switching device) 21 configured to switch and set a gain of the first amplifier circuit 20; a first peak hold circuit (a first peak hold device) 12 configured to hold a peak value of an amplified signal output from the first amplifier circuit 20; a second amplifier circuit (a second amplifier device) 30 configured to amplify the peak value held by the first peak hold circuit 12; a second gain switching circuit (a second gain switching device) 31 configured to switch and set a gain of the second amplifier circuit 30; a third amplifier circuit (a third amplifier device) 40 configured to amplify a light receiving signal output from another terminal 11b of the light receiving element unit 11; a third gain switching circuit (a third gain switching device) 41 configured to switch and set a gain of the third amplifier circuit 40; a second peak hold circuit (a second peak hold device) 13 configured to hold a peak value of an amplified signal output from the third amplifier circuit 40; a fourth amplifier circuit (a fourth amplifier device) 50 configured to amplify the peak value held by the second peak hold circuit 13; a fourth gain switching circuit (a fourth gain switching device) 51 configured to switch and set a gain of the fourth amplifier circuit 50; and an arithmetic control device 60 configured to analyze and detect a light receiving position of laser light received by the light receiving element unit 11, based on signals output from the second and the fourth amplifier circuits 30, 50.

Figure 2:
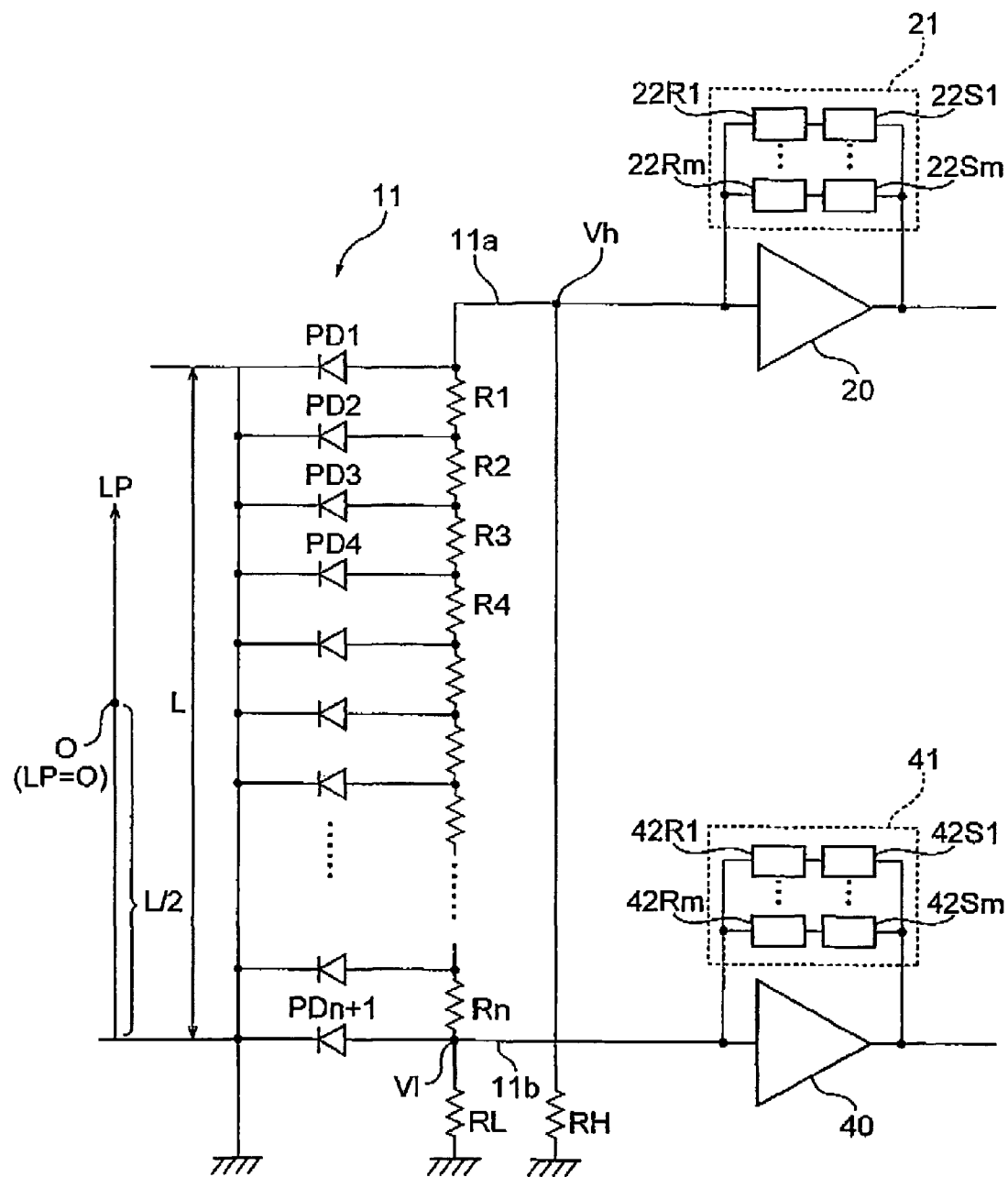
FIG. 2 is a schematic circuit diagram illustrating a structure of a light receiving element unit of the level detector illustrated in FIG. 1.

As illustrated in FIG. 2, the light receiving element unit 11 includes a plurality of light receiving elements PD1-PDn+1 which for example consist of photodiodes or the like. The plurality of light receiving elements PD1-PDn+1 are arranged in parallel with each other up and down (in vertical direction), and resistances R1-Rn are connected between anodes of the light receiving elements PD1-PDn+1 respectively. The anode of the light receiving element PD1 is grounded through the resistance RH, and the anode of the light receiving element PDn+1 is grounded through the resistance RL.

The first gain switching circuit 21 includes: a plurality of resistances 22R1-22Rm with different resistance values; and a plurality of switching circuits 22S1-22Sm connected in series with the resistances 22R1-22Rm respectively. Then a gain is switched by switching of ON of the switching circuits 22S1-22Sm, and the gain is set according to the resistances 22R1-22Rm corresponding to the switching circuits 22S1-22Sm which is ON.

The second gain switching circuit 31, the third gain switching circuit 41 and the fourth gain switching circuit 51 include the similar structures with the first gain switching circuit 21, therefore the explanation about these circuits are omitted.

The arithmetic control device 60 includes a digital conversion circuit unit 61 which is configured to convert the peak value signals output from the second amplifier circuit 30 and the fourth amplifier circuit 50 to digital values; and an arithmetic analysis control unit 62 which is configured to analyze and detect a light receiving position of laser light received by the light receiving element unit 11, based on the digital values converted by the digital conversion circuit unit 61. In addition, the arithmetic control device 60 transmits gain controlling signals for turning on each of the switching circuits 22S1-52Sq of the first to the fourth gain switching circuits 21-51.

Operations of the level detector 10 with such a structure will be described below.

First, detecting of the light receiving position of the light receiving element unit 11 irradiated by laser light will be described briefly.

For example, in a case that the voltages of resistances RH and RL are Vh and Vl respectively, and the resistance RH is equal to the resistance RH, in addition, a position irradiated by laser light (a light receiving position) is Lp, to detect the light receiving position effectively, it is preferable that such a condition $\Sigma R \gg RH (RL)$ is satisfied, where $\Sigma R$ being the summation of R1 to Rn. And when assuming that the position of the central point of the light receiving element unit 11 is O (original point position), the light receiving position Lp may be obtained by the following equation.

$$Lp=((Vh \cdot Vl)/(Vh+Vl)) \times L$$

where L is a length of the light receiving element unit 11.

Actually, even if the condition $\Sigma R \gg RH (RL)$ may not be satisfied, it is able to calculate Lp from each resistance R1 to resistance Rn and RH and RL easily that only multiply a brightness ratio α when the terminal end position of the light receiving element unit 11 is irradiated by laser light. More specially, the light receiving position may be obtained by the following equation.

$$Lp=((Vh \cdot Vl)/(Vh+Vl)) \times L \times \alpha$$

In general, the light receiving element includes photodiode, and it is able to utilize PIN type photodiode when a high speed is required.

Moreover, in the embodiment, the light receiving elements are arranged at equal spaces. In fact the equally spaced arrangement is not necessary, a state similar with the equally spaced arrangement may be obtained by adjusting values of the resistances between the light receiving elements. In addition, it is not necessary to utilize the light receiving elements with similar performances (for example area, amount of photoelectric conversion). In any event, it is easy to obtain the height position Lp by the ratio of the voltages Vh and Vl.

Next, operations of a level detection sensor 10 will be described.

When the light receiving element unit 11 receives laser light emitted from a rotation laser device not shown, a light receiving position of the light receiving element unit 11, i.e. a light receiving element PD which received the laser light supplies current according to the amount of light received, the light receiving signals of the voltages (Vh, Vl) corresponding to the current of the light receiving element PD and the position of the light receiving element PD are output from the terminals 11a and 11b.

The voltages Vh and Vl are amplified by the first amplifier circuit 20 and the third amplifier circuit 40 respectively. The gains of the first amplifier circuit 20 and the third amplifier circuit 40 are set respectively by the switching circuits (22S1-22Sm) and (42S1-42Sm) respectively which are turned on by the gain controlling signals output from the control device 60.

Peak values of the voltages of the light receiving signals amplified by the first amplifier circuit 20 and the third amplifier circuit 40 are held by the first peak hold circuit 12 and the second peak hold circuit 13 respectively, and the held voltages of the light receiving signals are further amplified by the second amplifier circuit 30 and the fourth amplifier circuit 50.

The first amplifier circuit 20 and the third amplifier circuit 40 amplify the voltages which are changed with time, so that it is unable to make the amplification degree large. However, the signals past the first peak hold circuit 12 and the second peak hold circuit 13 are held peak values, and the band (frequency band of input signals) is narrow, so that it is able to make the amplification degree of the second amplifier circuit 30 and the fourth amplifier circuit 50 large. In addition, due to amplifying the held peak values, simplified values are to be dealt with, so that in the arithmetic processing, the analysis is able to be performed easily.

The gains of the second amplifier circuit 30 and the fourth amplifier circuit 50 are amplified by predetermined gains respectively, with predetermined switching circuits being turned on.

The voltages of the light receiving signals amplified by the second amplifier circuit 30 and the fourth amplifier circuit 50 are converted to digital values by the digital conversion unit 61 of the arithmetic control device 60, and the arithmetic analysis control unit 62 analyzes and detects the light receiving position of laser light of the light receiving element unit 11, based on the digital values.

When the voltages of the light receiving signals amplified by the second amplifier circuit 30 and the fourth amplifier circuit 50 are too small or too large, and are outside of a proper light receiving range, and thereby the light receiving position of the light receiving element unit 11 may not be obtained correctly, the arithmetic control device 60 transmits the gain controlling signals to perform switching of ON of the switching circuits 21 to 51 of the first to the fourth gain switching circuits and then the gains are switched, so that the voltages of the light receiving signals become proper values.

When performing such switching, if the gains of the first amplifier circuit 20 and the third amplifier circuit 40 are set large, it is possible that the upper limits of the hold voltages of the first peak hold circuit 12 and the second peak hold circuit 13 are exceeded, therefore, by setting the gains of the first amplifier circuit 20 and the third amplifier circuit 40 to be low first, and then switching the gains of the second amplifier circuit 30 and the fourth amplifier circuit 50 to obtain proper signal voltages, consequently it is possible to analyze and obtain the light receiving position of laser light efficiently and rapidly.

In this case, first, by setting gains of the second gain switching circuit 31 and the fourth gain switching circuit 51 to be two values for example 1 time and 5 times, and comparing signals output by the second and the fourth amplifier circuits 30, 50 when the gain is 1 time with signals output by the second and the fourth amplifier circuits 30, 50 when the gain is 5 times, determining if the signals are of proper largeness and then performing the analysis of the light receiving position, it is possible to analyze and obtain the light receiving position of laser light more efficiently and rapidly.

Meanwhile, to amplify the light receiving signals output from the terminals 11a and 11b of the light receiving element unit 11 by the first and the third amplifier circuits 20, 40, and the second and the fourth amplifier circuits 30, 50, by two stages, it is possible to switch the gain by such number that the number of the switching circuits of the first and the third gain switching circuits 21, 41 multiplies the number of the switching circuits of the second and the fourth gain switching circuits 31, 51. Therefore, even the summation of the number of the switching circuits of the first and the third gain switching circuits 21, 41 and the number of the switching circuits of the second and the fourth gain switching circuits 31, 51 are lessened, it is possible to obtain great number of switching of the gain, so that even the power supply voltage is utilized with a low voltage, the saturation does not generate and it is possible to structure the first to the fourth gain switching circuits 21 to 51 simply.

In addition, it is able to enlarge the light receiving range of the position detection device of the detector without dropping light receiving sensitivity and with accuracy maintained, by analyzing with the arithmetic control device as a plurality of light receiving element units with similar circuit structure being arranged in parallel and interlocked mutually. Moreover, at this time, it is possible to analyze the signals from a plurality of circuit structures in the arithmetic processing device, assuming that the position of the center part of the arrangement of the plurality of light receiving element units is LP=O.

The preferable embodiment of the present invention is described as above, accompany with the drawings. The descriptions and drawings should be regarded as illustrative in nature and not as restrictive. Accordingly, it should be understood that the present invention covers modifications and variations made to the structure of the present invention such as modification of the design or the like, without departing from the scope or the spirit of the invention.

What is claimed is:

1. A level detector, comprising:
   a position detection device including a plurality of light receiving elements arranged in parallel with each other;
   a first amplifier device configured to amplify a light receiving signal output from a terminal of the position detection device;
   a first gain switching device configured to switch and set a gain of the first amplifier device;
   a first peak hold device configured to hold a peak value of an amplified signal output from the first amplifier device;
   an arithmetic control device configured to analyze a light receiving position of laser light received by the position detection device;

a second amplifier device configured to amplify the peak value of the amplified signal held by the first peak hold device; and a second gain switching device configured to switch and set a gain of the second amplifier device, wherein the arithmetic control device analyzes the light receiving position of laser light received by the position detection device, based on a signal output from the second amplifier device.

2. A level detector according to claim 1, wherein switching of the first gain switching device and the second gain switching device is performed by a controlling signal from the arithmetic control device.

3. A level detector according to claim 1, wherein when the signal input into the arithmetic control device is outside of a range of detection, the arithmetic control device transmits the controlling signal to the first gain switching device to adjust the amplified signal of the first amplifier device, and the controlling signal to the second gain switching device to adjust the amplified signal of the second amplifier device, with a predetermined procedure.

4. A level detector according to claim 1, wherein when the signal input into the arithmetic control device is outside of a range of detection, when the arithmetic control device adjusting the second gain switching device to the first gain switching device preferentially, the arithmetic control device transmits the controlling signal to the second gain switching device and switches the gains of the second gain switching device until the controlling signal is detectable.

5. A level detector according to claim 1, wherein when the signal input into the arithmetic control device is outside of a range of detection, when the arithmetic control device adjusting the first gain switching device to the second gain switching device preferentially, the arithmetic control device transmits the controlling signal to the first gain switching device and switches the gains of the first gain switching device until the controlling signal is detectable.

6. A level detector, comprising:

a position detection device including a plurality of light receiving elements arranged in parallel with each other;

a first amplifier device configured to amplify a light receiving signal output from one terminal of the position detection device;

a first gain switching device configured to switch and set a gain of the first amplifier device;

a first peak hold device configured to hold a peak value of an amplified signal output from the first amplifier device;

a third amplifier device configured to amplify a light receiving signal output from another terminal of the position detection device;

a third gain switching device configured to switch and set a gain of the third amplifier device;

a second peak hold device configured to hold a peak value of an amplified signal output from the third amplifier device;

an arithmetic control device configured to analyze a light receiving position of laser light received by the position detection device;

a second amplifier device configured to amplify the peak value held by the first peak hold device;

a second gain switching device configured to switch and set a gain of the second amplifier device;

a fourth amplifier device configured to amplify the peak value held by the second peak hold device; and a fourth gain switching device configured to switch and set a gain of the fourth amplifier device;

wherein the arithmetic control device analyzes the light receiving position of laser light received by the position detection device, based on signals output from the first to the fourth amplifier device.

* * * * *